2,963,471

STYRENE POLYMERIZATION WITH ARYLTITANIUM TRIALKYLATE CATALYSTS

Daniel F. Herman, Orange, N.J., assignor to National Lead Company, New York, N.Y., a corporation of New Jersey No Drawing. Filed Aug. 18, 1959, Ser. No. 834,402

6 Claims. (Cl. 260—93.5)

This invention relates to novel organotitanium compounds. More particularly, it relates to organotitanium compounds involving a stable carbon-titanium bond. Still more specifically, this invention relates to aryltitanium alkylates and to methods for preparing the same.

This application is a continuation-in-part of my application Serial No. 597,344, filed July 12, 1956, now abandoned.

Numerous attempts have been made in the past to produce compounds involving direct carbon-titanium bonds, however, all attempts have been unsuccessful since they tried to replace all of the substituents on the titanium with alkyl or aryl groups.

It is an object of this invention, therefore, to provide novel organotitanium compounds. A further object is to provide novel organotitanium compounds which contain carbon-titanium bonds. A particularly desirable object is to produce such carbon-titanium bonded compounds which are sufficiently stable to permit the preparation of such compounds in quantity for storage prior to use. It is also an object of this invention to provide methods for the manufacture of such compounds. It is a further object to employ these carbon-titanium bonded compounds as catalysts for polymerization of styrene. Other objects and advantages of the present invention will become apparent from the following more complete description and claims.

In its broadest aspects this invention contemplates an aryltitanium trialkylate, said aryltitanium trialkylate being an ester of tetravalent titanium wherein one to two of the four valencies of said tetravalent titanium are satisfied by aryl groups through a direct carbon-titanium bond, and the remaining two to three valencies of said titanium are satisfied by alkoxy groups through oxygen-titanium bonds. The aryl group in said aryltitanium trialkylate may be phenyl, substituted phenyl, naphthyl or substituted naphthyl groups. The substituents in said substituted phenyl or naphthyl groups are lower alkoxy, lower alkyl and phenyl.

This invention further contemplates a particular complex formation which is the equimolecular addition compound of phenyltitanium triisopropylate, lithium isopropylate, lithium bromide and ethyl ether, having the formula:

$$C_6H_5Ti(OC_3H_7)_3 \cdot Li(OC_3H_7) \cdot LiBr \cdot (C_2H_5)_2O$$

This invention also contemplates the method of producing aryltitanium trialkylate which comprises reacting a tetraalkyl orthotitanate or an alkoxytitanium halide with an aryl Grignard reagent or metal aryl, said tetraalkyl orthotitanate or alkoxytitanium halide being present in amount to provide at least one mole of tetraalkyl orthotitanate or alkoxytitanium halide for each equivalent of said Grignard reagent or metal aryl, i.e. no excess of the aryl Grignard reagent or metal aryl should be employed.

Previous attempts to prepare compounds containing carbon-titanium bonds have apparently always proceeded along the lines of selecting amounts of reagents sufficient for the substitution of four alkyl or aryl groups for the chloride or alkoxy groups in the titaniferous starting material (tetraalkyl orthotitanates or alkoxytitanium chlorides, for example). However, compounds of tetravalent titanium having more than two Ti—C bonds are, for all practical purposes, non-existent.

It has now been discovered that it is possible to prepare compounds containing only 1 or 2 Ti—C bonds for each titanium atom and that these compounds are relatively stable, and in some cases may be produced in bulk and stored for reasonable lengths of time (i.e. several days and in some cases several months or even years) before use.

It has further been found that these compounds may be produced in good yield and without undue difficulty by avoiding the addition of proportions in excess of 2 moles of arylating agent to 1 mole of titanium compound. Thus the quantities of reactants employed should be substantially not in excess of those which will theoretically produce one or two Ti—C bonds for each titanium atom, i.e. one or two equivalents of metal aryl or aryl Grignard reagent for each atom of titanium in the titaniferous starting material. Moreover, it has been found that the stability of the products is enhanced if the amount of the metal aryl or aryl Grignard reagent is somewhat less than that required to react with all of the titanium ester; i.e. it is preferred to use an excess (say 10-25% excess) of titanium ester over that required to supply one titanium atom for each 1 to 2 equivalents of the metal aryl or aryl Grignard reagent used.

The aryl groups which may be utilized in the preparation of the compounds according to the present invention include phenyl and naphthyl groups and substituted phenyl and naphthyl groups are lower alkoxy, lower alkyl and phenyl groups. The terms "lower alkoxy" and "lower alkyl" is meant to include those having from 1 to 6 carbon atoms in the hydrocarbon chain. Among those which are the most readily available are methyl, ethyl, isopropyl, butyl and cyclohexyl.

The aryl groups just described may be employed in the form of aryl Grignard reagents or metal aryls. Among the aryl Grignard reagents which are most desirable are those of magnesium, aluminum and zinc. Metal aryls which are the most useful are those of Li, Mg, Al, Cd, Zn, Ca, Na and K. Typical compounds of such aryl Grignard reagents and metal aryls include, for example, phenylmagnesium bromide, tolylithium, p-tolylithium, phenylaluminum chlorides, diphenylzinc, diphenylcadmium, diphenylmagnesium, sodium naphthyl-1, phenylcalcium iodide, potassium naphthyl-2 and the like.

The alkoxy groups of the titaniferous starting material according to the present invention may be substituted or unsubstituted and saturated or unsaturated groups containing up to about 16 carbon atoms. It is preferred, however, to use alkoxy groups having less than six carbon atoms, because such groups are more reactive, and give products, in general, which are more readily isolated.

The preferred method of preparation of the aryltitanium trialkylate according to this invention is simply to add the aryl Grignard reagent or metal aryl to the tetraalkyl orthotitanate or alkoxytitanium halide in stoichiometric proportions and in the presence of a solvent such as ether, to produce a monoaryltitanium trialkylate, the process being carried out in inert atmosphere at or slightly below room temperature. The resulting product is a solid suspension or a solution of aryltitanium trialkylate or complexes thereof.

The products prepared from metal aryls, e.g. lithium aryl, tend to form complexes with the by-products and other substances present in the system (e.g. the solvent), In some cases (for example that in which phenyltitanium triisopropylate is prepared from phenyllithium and titanium tetraisopropylate in a diethyl ether medium) the complex formed is sufficiently insoluble to precipitate out, and can then be separated by decantation, filtration or the like.

In preparing the phenyltitanium triisopropylate complex from phenyllithium and titanium tetraisopropylate, the phenyllithium may be prepared in the following manner.

Lithium metal shot is placed in anhydrous ether and bromobenzene is added dropwise. The reaction may be represented by the following equation:

$$C_6H_5Br + 2Li \rightarrow C_6H_5Li + LiBr$$

since the LiBr formed is soluble in ether, the LiBr remains in solution together with the phenyllithium.

The phenyllithium containing ether solution (which also contains the LiBr), is added slowly to a tetraalkyl orthotitanate, as for example, titanium tetraisopropylate. A white crystalline insoluble solid complex is obtained. The reaction and the analytical results substantiated that the complex formed has the following composition:

$$C_6H_5Ti(OC_3H_7)_3 \cdot Li(OC_3H_7) \cdot LiBr \cdot (C_2H_5)_2O$$

The reaction is as follows:

$$(C_3H_7O)_4Ti + C_6H_5Li + LiBr \xrightarrow{Et_2O}$$
$$C_6H_5Ti(OC_3H_7)_3 \cdot LiOC_3H_7 \cdot LiBr \cdot (C_2H_5)_2O$$

In other cases, the complex may be soluble, in which case it is not easily separated as such, usually breaking down to give the free aryltitanium trialkylate. When the magnesium Grignards are used, for example, the formation of a complex apparently does not take place, or if it does, the complexes formed are soluble and too unstable to be isolated as such. However, when complexes are formed, they are frequently more stable than the aryltitanium trialkylate itself, and thus offer a convenient form in which to handle, purify and store these compounds.

When it is desired to separate the aryltitanium trialkylate from a complex such as described above and having the formula:

$$C_6H_5Ti(OC_3H_7)_3 \cdot Li(OC_3H_7) \cdot LiBr \cdot (C_2H_5)_2O$$

it has been found that this may be accomplished by adding to each mole of the complex, one equivalent of an organo-soluble metal halide capable of reacting metathetically with lithium alcoholates to form the corresponding metal alcoholates and lithium halides. Many examples of such compounds include metal halides which are Lewis acids, among which are halides of silicon, titanium, tin, aluminum, boron and zirconium and the like.

It is preferred to use the halides of titanium since they have the additional advantage that the titanium tetraalcoholate produced does not complicate the system by the introduction of foreign substances. Whatever metal halide is employed, it is preferred, for the sake of convenience, to add the same as a solution in a suitable solvent such as ethyl ether or petroleum ether. The other product of the metathesis, that is, the lithium halide, forms an inert precipitate and may be separated by filtration or any other convenient means. The aryltitanium trialkylate may then be recovered by ordinary methods, for example, stripping off the solvent by vacuum evaporation. Suitable precautions should, of course, be observed to avoid atmospheric oxidation or moisture contamination. In some cases, when the titanium tetrahalide is dissolved in a solvent which also is capable of dissolving appreciable amounts of lithium halide, such as ethyl ether for example, it is desirable to modify the solvent system by evaporating a portion of the original solvent and replacing it with one which does not dissolve any appreciable quantity of lithium halide. Petroleum ether is such a solvent.

In order to effect the separation of the aryltitanium trialkylate from the complex by reacting the complex with a metal halide, the metal halide was added slowly to the crystallized complex in the presence of ether and the complex slowly dissolved as the reaction proceeded. The solution obtained is then cooled to form the aryltitanium trialkylate. The following equation illustrates the type of reaction which occurs:

$$C_6H_5Ti(OC_3H_7)_3 \cdot LiOC_3H_7 \cdot LiBr \cdot (C_2H_5)_2O$$
$$+ \tfrac{1}{4} TiCl_4 \rightarrow C_6H_5Ti(OC_3H_7)_3 + \tfrac{1}{4}(C_3H_7O)_4Ti$$
$$+ LiBr + (C_2H_5)_2O + LiCl$$

In order to more fully illustrate the nature and preparation of the novel organotitanium compounds of this invention, the following examples are presented.

Example 1

841.4 parts of tetraisopropyl titanate were dissolved in 1500 parts of anhydrous diethyl ether and the resulting solution was admixed in a water-jacketed glass-lined vessel with 248.8 parts of phenyllithium as a 1 N solution in diethyl ether. The mixing operation took place over a period of 2½ hours during which time the jacket was supplied with cooling water to maintain the temperature of the mixture at around 18° C. The entire operation was carried out under an atmosphere of dry nitrogen. Throughout the mixing period and for an additional short time thereafter, the mixture in the vessel was agitated by means of a glass covered sweep agitator. As the phenyllithium solution was added to the isopropyl titanate, the mixture gradually darkened to a clear amber. When approximately ¾ of the phenyllithium had been added, a white crystalline solid began to precipitate. A portion of this solid was analyzed and was found to be an addition compound of phenyltitanium triisopropylate lithium isopropylate, lithium bromide and diethyl ether, corresponding to the formula:

$$C_6H_5Ti(OC_3H_7)_3 \cdot LiOC_3H_7 \cdot LiBr \cdot (C_2H_5)_2O$$

This addition compound was separated by centrifugation from the liquid portion of the mixture which was essentially diethyl ether containing a small amount of dissolved phenyltitanium triisopropylate complex. 530 parts of the separated addition compound were then dispersed in 500 parts of petroleum ether (30–60° C. boiling point) was treated over a period of 1½ hours with 52 parts (about 10% excess) of titanium tetrachloride dissolved in 500 parts of diethyl ether. Agitation, cooling and inert atmosphere were again maintained as above described and the agitation was again continued for a short time after the reaction appeared to be complete. As the titanium tetrachloride solution was added, the major portion of the solid material disappeared, to be replaced by a much smaller volume of fine crystals which, upon subsequent analysis, proved to be lithium chloride and lithium bromide. These crystals were separated by centrifugation from the liquid portion of the mixture and the liquid portion, consisting essentially of phenyltitanium triisopropylate dissolved in the mixture of solvents, was subjected to vacuum distillation at room temperature to strip off a portion of the solvents. Pressure employed was 100–200 millimeters. When about half of the solvents had been stripped off, the product, phenyltitanium triisopropylate, crystallized in good yield, and was separated by decantation. The entire procedure, from the original admixture of phenyllithium solution was tetraisopropyl titanate to the final decantation and separation of phenyltitanium triisopropylate, was carried out in the presence of a nitrogen atmosphere.

A portion of the phenyltitanium triisopropylate-lithium isopropylate-lithium bromide-ether complex intermediate was stored for two years at room temperature and then was treated with titanium tetrachloride solution to produce phenyltitanium triisopropylate in the manner above described. The purity and reactivity of the complex and the yield in which phenyltitanium triisopropylate was recovered were substantially unaffected by the storage.

Phenyltitanium triisopropylate is a white crystalline material melting at 88-90° C. to give a clear yellow liquid, which decomposes on heating to 120° C. It readily oxidizes in air and decomposes upon warming to trivalent titanium compounds and free phenyl radicals. It may, however, be stored indefinitely at 10° C.

In order to illustrate the use of phenyltitanium triisopropylate as a polymerization catalyst, a portion of phenyltitanium triisopropylate prepared as above described was used in the polymerization of styrene according to the following procedure. One part of phenyltitanium triisopropylate was dissolved in a mixture of 200 parts of benzene and 200 parts of styrene and the mixture was heated for five hours at 80° C. For purposes of comparison, a similar procedure was employed using one part of benzoyl peroxide dissolved in a mixture of 200 parts of benzene and 200 parts of styrene. The yields of polymers produced were approximately identical in both cases.

Example 2

176.5 parts of phenyllithium dissolved in 1000 parts of diethyl ether were added slowly to 596.9 parts of isopropyl titanate dissolved in 1450 parts of diethyl ether. The addition took place over a period of 1½ hours and the reaction was essentially complete at the end of that time. The entire operation was carried out at approximately room temperature and under an atmosphere of dry nitrogen. To this mixture was added 120 parts of titanium tetrachloride dissolved in 2000 parts of ether. Lithium chloride precipitated and was separated from the mixture by decantation. To the remaining liquid portion of the mixture were added 382.6 parts of benzophenone dissolved in 500 parts of ether. The mixture was stirred and then allowed to stand overnight, and subsequently refluxed 7 hours. The so-produced addition compound was subsequently hydrolyzed by adding to it 400 parts of 5% $H_2SO_4$. The reaction mixture separated into two layers, a water layer containing sulfuric acid, titanium sulfate and isopropyl alcohol in solution, and an ether layer containing the product, triphenylcarbinol. The two layers were separated by decantation. The ether layer was washed with water, stripped of part of its ether by distillation under reduced pressure on the steam bath and finally steam-distilled to separate the triphenylcarbinol from impurities. The steam distillate was then extracted with ether and the ether extract distilled at four millimeters pressure to remove residual unreacted benzophenone. The residue, which crystallized on cooling, was recrystallized from carbon tetrachloride and had a melting point of 162–163° C., and was found to be essentially pure triphenylcarbinol.

Example 3

Approximately 775 parts (theoretical) of α-naphthylmagnesium bromide were prepared from 690 parts of α-bromonaphthalene and 85 parts of magnesium in 3000 parts of ether according to the usual procedures for the preparation of Grignard reagents. The Grignard reagent crystallized and a thick yellow slurry resulted. This slurry was added gradually over a period of one hour through a wide rubber tube to a glass vessel equipped with a stirrer and containing 1140 parts of tetrabutyl titanate dissolved in 3000 parts of ether. The entire procedure was carried out in an inert atmosphere of circulating dry nitrogen. The insoluble Grignard reagent dissolved immediately upon introduction indicating a very rapid reaction. When the addition was complete the reaction mixture was a clear brownish-orange solution containing α-naphthyltitanium tributylate. This solution was used without further purification for the polymerization of styrene according to the procedure described in Example 1, using 5 parts of the solution and 40 parts of styrene dissolved in 35 parts of benzene. The results were similar to those produced both by phenyltitanium triisopropylate and by benzoyl peroxide in Example 1.

Example 4

A Grignard reagent was prepared by adding 684 parts of p-bromotoluene to 97 parts of magnesium in 2000 parts ethyl ether. This Grignard reagent was added in small portions over a period of 55 minutes to 1360 parts butyl titanate dissolved in xylene and cooled to 15° C. The insoluble Grignard reagent again dissolved immediately upon introduction, to produce a clear amber solution containing p-tolyltitanium tributylate.

Example 5

The procedure of Example 3 was repeated, substituting for the α-bromonaphthalene an equivalent quantity of p-anisyl bromide. The product was p-anisyltitanium tributylate.

The organotitanium compounds of this invention are the first successfully prepared stable organic compounds containing a direct carbon-titanium bond. They are useful as reactive intermediates in the synthesis of more complex organic and organotitanium compounds, as catalysts for the polymerization of styrene and in various other ways which the unique chemical structure of these compounds will suggest to those skilled in the art.

In addition to preparing aryltitanium trialkylate, this invention also contemplates a process for preparing polystyrene which comprises admixing styrene with a catalyst, said catalyst comprising an organotitanium compound containing from 1 to 2 Ti—C bonds and having the formula:

$$R_nTiX_{(4-n)}$$

where R is selected from the group consisting of alkyl or aryl, X is selected from the group consisting of alkoxide and halide and where n is from 1 to 2.

The alkyl group in said catalytic compound may be varied considerably but preferably should contain from 1 to about 16 carbon atoms and may be substituted or nonsubstituted.

The aryl group should be selected from the group consisting of phenyl, substituted phenyl, naphthyl and substituted naphthyl. The substituent in the substituted naphthyl or substituted phenyl should be selected from the group consisting of lower alkoxy, lower alkyl and phenyl groups. The term lower alkoxy and lower alkyl is meant to include those having from 1 to 6 carbon atoms in the hydrocarbon chain. Among those which are the most readily available are methyl, ethyl, isopropyl, butyl and cyclohexyl.

The alkoxy group, like the alkyl group, should preferably contain from 1 to about 16 carbon atoms and may be substituted or nonsubstituted, saturated or unsaturated; and the halide may include any of the halogens, although chlorides, bromides and iodides are preferred since fluorides, in most cases, are not too readily available.

The most desirable methods for producing the catalysts are as follows: (1) an alkyl titanate is reacted with a metal alkyl or metal aryl compound, (2) titanium tetrahalide is reacted with a metal alkyl or aryl compound including Grignard reagents, (3) an alkoxy titanium halide of the form alkoxy$_n$ Ti halide$_{(4-n)}$ where n is from 0 to 4, is reacted with a metal alkyl or metal aryl including Grignard reagents. The amounts of such reagents are chosen so that from 1 to 2 moles of arylating or alkylating reagent is reacted with 1 mole of the titanium compound, the quantities of reactants being employed so that the arylating or alkylating agents are not in excess of those which will theoretically produce more than 1 or 2 Ti—C bonds for each titanium atom.

As stated above, the catalyst used in the instant invention contains from 1 to 2 Ti—C bonds and it has been discovered that when such catalysts are employed, they generate free radicals and reduced titanium compounds at a predeterminable and reproducible rate which are the catalytic active fragments in the polymerization process. It is believed that the Ti—C bonds in such compounds undergo homolytic cleavage. Using these compounds, therefore, the formation of free radicals and the reduced titanium compounds takes place continuously over an extended time period thus permitting the catalytic fragments to be formed throughout the entire polymerizing reaction. The release of these fragments results in the formation of chain initiators which provide the energy for the polymerization reaction.

All of the compounds used as catalysts in the instant invention undergo homolytic cleavage of the Ti—C bonds at a determinable rate. The rate is controlled by the various substituents on the titanium compound as follows:

(1) The number of R groups, $R_2$ yields chain initiators faster than $R_1$
(2) Alkyl groups yield chain initiators faster than aryl
(3) Halogen yield chain initiators faster than alkoxy
(4) Chain initiation increases with increased temperature
(5) Solvent variations It is, therefore, possible to select catalysts containing 1 or 2 Ti—C bonds according to the instant invention which will undergo homolytic cleavage at room temperature over considerable variety of time periods; for example, in a matter of minutes in the case of dialkyl titanium dihalide, to several weeks in the case of aryltitanium trialkylate.

Most of these catalysts are soluble in the solvents used for carrying out the polymerization reaction and, therefore, effective and efficient homogeneous reaction systems are obtained.

The catalysts used for polymerization in the instant invention are simple to prepare. The reactants are merely mixed together and either used immediately as polymerization agents or are separated from the reactant products and stored until their use is desired. The preparation of one particular type of catalyst, i.e. aryl titanium trialkylate has already been described in detail in this specification.

In carrying out the polymerization of styrene, the catalyst is preferably added to a solvent. Many solvents may be employed for this purpose. Among the aliphatic solvents which may be employed are the non-polar saturated straight chain and branched compounds which include pentane, heptane, butane, 2,2-dimethyl butane, methyl butane, iso-octane, tricosane, paraffin, mineral oil, diesel oil, kerosene, mineral spirits, petroleum ether and the like. Aromatic solvents which are particularly useful include benzene, chlorobenzene, toluene, xylene, mesitylene and tetralin. Cyclohexane and methylcyclohexane are among the cycloaliphatics which may also be employed. Although it is preferred to employ a solvent, it is not necessary since the styrene monomer may take the place of the solvent itself. If a solvent is employed it may be present in any amount up to 90% of the total charge.

The polymerization reaction should be carried out at temperatures between 0° C. and 150° C.

In order to carry out the reaction it is desirable to employ 1 gram mole of the titanium compound as the catalyst for each pound to 100 pounds of the monomer.

At the end of the reaction the polystyrene formed in the vessel is removed and washed to remove the solvent and reaction by-products.

Example 6

Diphenyltitanium dibutylate was used as the catalyst for polymerizing styrene. This catalyst was prepared by reacting 2 moles of phenyl magnesium bromide with 1 mole of butyl titanate. The catalyst has 2 Ti—C bonds. In carrying out the polymerization of styrene, 0.04 mole of the catalyst was dissolved in 150 ml. of cyclohexane and charged to a reaction vessel having a 2 liter void. Five hundred grams of styrene were added to the mixture at room temperature. The mixture was then warmed to 40° C. for a period of 24 hours.

The mixture was then cooled and the polystyrene product was removed and washed. Two hundred forty-five grams of polystyrene were recovered. The polystyrene was white, linear and possessed an extremely high molecular weight.

Example 7

Dimethyltitanium dichloride was used as a catalyst for polymerizing styrene. Dimethyltitanium dichloride containing 2 Ti—C bonds was prepared by reacting .04 mole of titanium tetrachloride with .08 mole of methylmagnesium iodide in 50 ml. of ether. .036 mole of the catalyst was dissolved in 150 ml. of n-hexane and was charged to a vessel as in Example 6.

Five hundred grams of styrene were added to the mixture and heated and agitated to a temperature of 50° C. for a period of 24 hours. The mixture was cooled, opened and the polystyrene was removed and washed. A high yield of white, linear, macromolecular polystyrene was obtained.

Example 8

Phenyltitanium triisopropylate was used as the catalyst for the polymerization of styrene. Phenyl magnesium bromide was reacted with isopropyl titanate on a mole for mole basis in ether to prepare .034 mole of phenyl titanium triisopropylate which contained 1 Ti—C bond. The catalyst was dissolved in 150 ml. of cyclohexane and charged to a vessel at room temperature. Five hundred grams of styrene were then added to the mixture and agitated for 24 hours. The polystyrene product was similar to that previously described except that a lower yield was obtained.

Example 9

Isopropyltitanium tributylate was used as the catalyst for polymerizing styrene. The catalyst was prepared by reacting 1 mole of isopropyl magnesium chloride with 1 mole of butyl titanate. .04 mole of the catalyst isopropyltitanium tributylate was dissolved in n-heptane. Five hundred grams of styrene were added to the mixture and it was heated to 50° C. over a 15 hour period. The mixture was cooled and then opened and the polystyrene removed, washed and found to be substantially the same as that isolated in the previous examples.

Example 10

Dimethyltitanium dichloride was prepared as in Example 7. 0.04 mole was dissolved in 1 liter of n-heptane. Styrene was added to the solution containing the catalyst and it was heated to 40° C. over a 16 hour period. Polystyrene was recovered and it was substantially the same product as that produced in the above examples.

Example 11

Dimethyltitanium diisopropylate was prepared by reacting 2 moles of methylmagnesium iodide with 1 mole of isopropyl titanate. 0.02 mole of the catalyst dimethyltitanium diisopropylate was dissolved in 600 ml. of toluene. Styrene was added to the solution and the mixture agitated for 8 hours. The polystyrene was recovered and it was equivalent to the product isolated in Example 8.

Example 12

Dimethyltitanium dichloride was prepared for use as a catalyst for polymerizing styrene by reacting 0.05 mole of $TiCl_4$ with 0.10 mole methylmagnesium bromide for 30 minutes at 30° C. in 100 ml. of toluene. To this catalyst was added 190 grams of styrene, equivalent to 1 gram mole of $TiCl_4$ per 84 lbs. of styrene, and the mixture heated initially for 3 hours at 50–65° C. and then for 3 hours at 80–90° C. The yield of polystyrene was 90%.

Example 13

Dimethyltitanium dichloride was prepared for use as a catalyst for polymerizing styrene as in Example 12 above except that amounts of reactants used here are half the amounts used in Example 12. The catalyst was aged for 20 hours and thereafter 190 grams of styrene was added slowly in 90 minutes, equivalent to 1 gram mole $TiCl_4$ per 170 lbs. styrene, and the mixture heated for 2½ hours at 50–70° C. The yield of polystyrene was 83%.

Example 14

Diphenyltitanium dibutylate was prepared as a catalyst for polymerizing styrene by stirring 0.20 mole phenyl magnesium bromide with 0.1 mole butyl titanate for 15 minutes at 40° C. in 100 ml. of toluene. Thereafter 90 grams of styrene were added to the catalyst, equivalent to 1 gram mole $TiCl_4$ per 20 lbs. styrene, and the mixture heated for 1 hour at 80° C. The yield of polystyrene was 20%.

Example 15

Two experiments were conducted using dimethyltitanium dichloride as catalyst. In one the catalyst was prepared by stirring 0.2 mole $TiCl_4$ with 0.2 mole methylmagnesium bromide for 30 minutes in 150 moles of xylene and to this was added 45 grams of styrene, equivalent to 1 gram mole $TiCl_4$ per 5 lbs. styrene, and the mixture heated for 2 hours at 120° C. The yield of polystyrene was 50%. In the second experiment the identical procedure was followed except that toluene was used as the solvent and the temperature used at polymerization was 120° C. Again the yield was 50%.

From the above description and by the examples presented, it has been clearly shown that a superior type of polystyrene has been produced which is characterized by being linear and possessing a high molecular weight. The products of the instant invention are new and unique due to the linear nature and high molecular weight of the products and may be used for many purposes requiring these physical properties.

While this invention has been described and illustrated by the examples shown, it is not intended to be strictly limited thereto, and other modifications and variations may be employed within the scope of the following claims.

I claim.

1. Method for polymerizing styrene which comprises admixing said styrene with an aryltitanium trialkylate compound, the amount of said styrene in said mixture being from 1 pound to 100 pounds for each gram mole of the titanium compound, the temperature of said mixture being from 0° C. to 150° C., said aryltitanium trialkylate being an ester of tetravalent titanium wherein one of the four valencies of said tetravalent titanium is satisfied by an aryl group through a direct carbon-titanium bond, and the remaining three valencies of said titanium are satisfied by alkoxy groups through oxygen-titanium bonds, said alkoxy containing from 1 to 16 carbon atoms, said aryl group being selected from the group consisting of phenyl, substituted phenyl, naphthyl and substituted naphthyl, the substituent in said substituted phenyl and substituted naphthyl are selected from the group consisting of lower alkoxy, lower alkyl and phenyl, said lower alkoxy and said lower alkyl containing from 1 to 6 carbon atoms in the hydrocarbon chain, and separating therefrom the polystyrene formed.

2. Method according to claim 1 in which the trialkylate is tributylate.

3. Method according to claim 1 in which the trialkylate is triisopropylate.

4. Method according to claim 1 in which the aryl group is phenyl.

5. Method according to claim 1 in which the aryl group is α-naphthyl.

6. Method according to claim 1 in which the aryl group is p-tolyl.

References Cited in the file of this patent

UNITED STATES PATENTS

| | | |
|---|---|---|
| 2,721,189 | Anderson et al. | Oct. 18, 1955 |
| 2,822,357 | Brebner et al. | Feb. 4, 1958 |
| 2,839,518 | Brebner | June 17, 1958 |
| 2,862,917 | Anderson et al. | Dec. 2, 1958 |
| 2,879,263 | Anderson et al. | Mar. 24, 1959 |
| 2,882,264 | Barnes et al. | Apr. 14, 1959 |